(No Model.) 2 Sheets—Sheet 2.

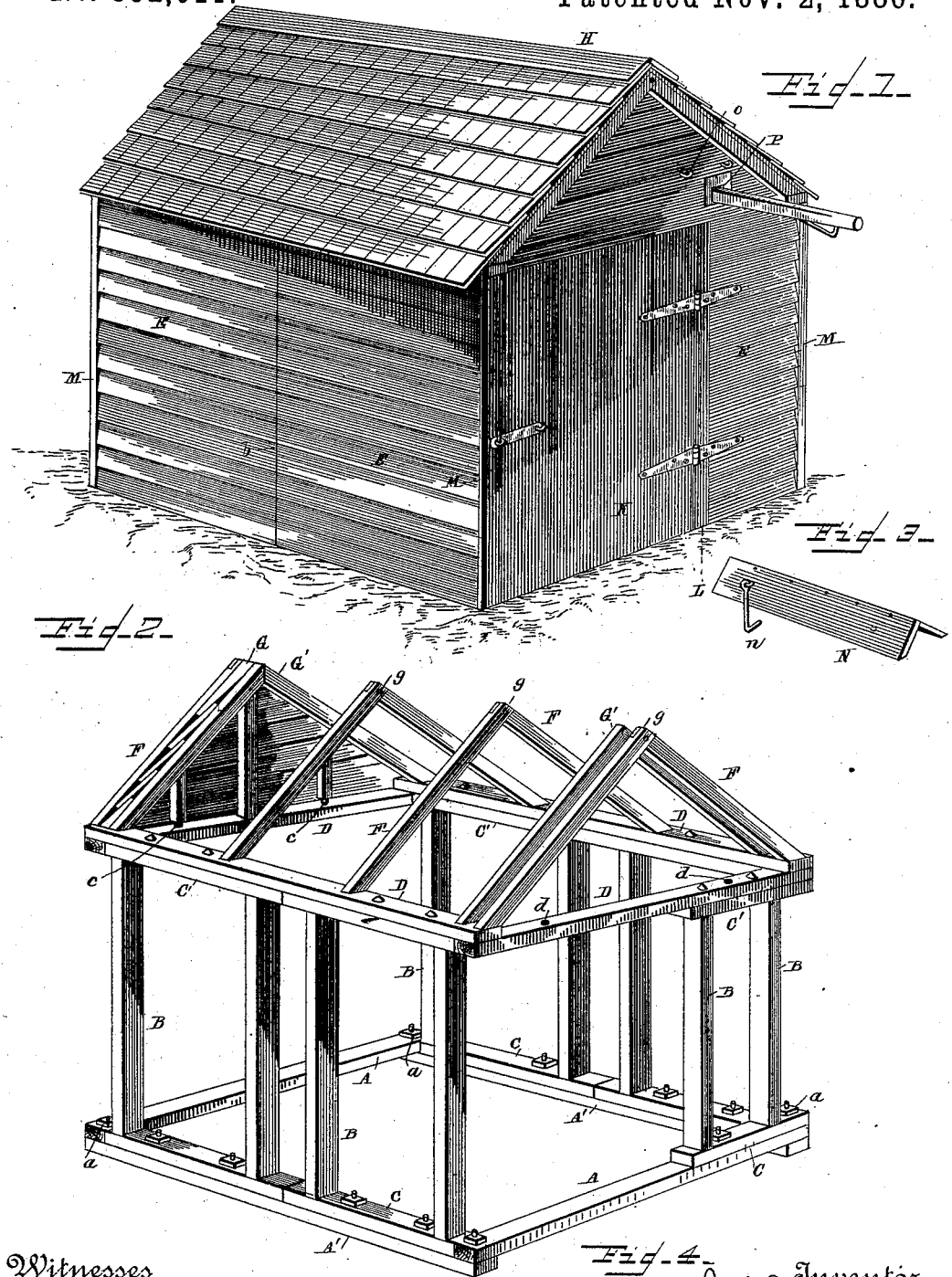

J. K. P. SHELTON.
PORTABLE HOUSE.

No. 352,011. Patented Nov. 2, 1886.

Witnesses
Edwin T. Yewell,
Jos. A. Ryan

Inventor
J. K. P. Shelton
By his Attorney
W. A. Redmond

UNITED STATES PATENT OFFICE.

JAMES K. P. SHELTON, OF GASTON, ALABAMA.

PORTABLE HOUSE.

SPECIFICATION forming part of Letters Patent No. 352,011, dated November 2, 1886.

Application filed July 7, 1886. Serial No. 207,311. (No model.)

*To all whom it may concern:*

Be it known that I, JAMES K. P. SHELTON, a citizen of the United States, residing at Gaston, in the county of Sumter and State of Alabama, have invented certain new and useful Improvements in Portable Houses; and I do hereby declare the following to be a full, clear, and exact description of the invention, such as will enable others skilled in the art to which it appertains to make and use the same.

This invention relates to portable houses; and it has for its object to provide a cheaply-constructed, light, durable, and convenient house, which one man can build or put together or take apart with ease, the several parts being light and held together by pins and bolts, which may be unpinned and unbolted in a few minutes; and it consists of the parts and combinations of parts hereinafter described and claimed.

Figure 5:
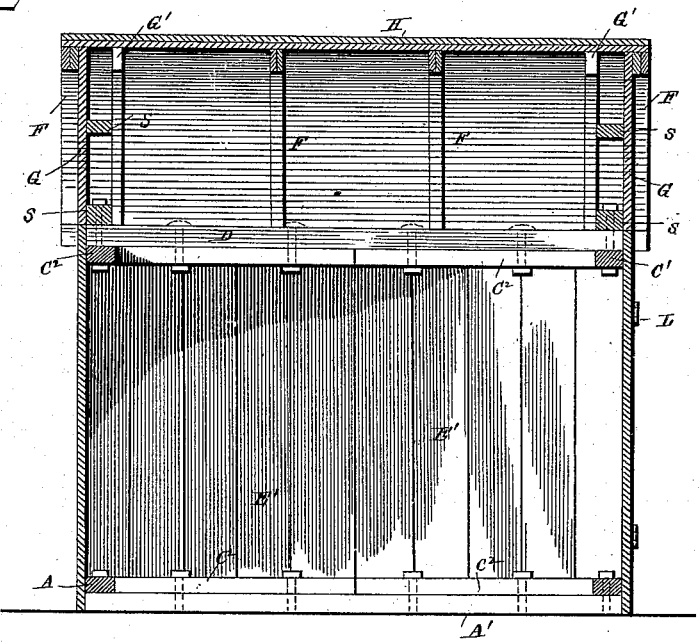
Figure 6:
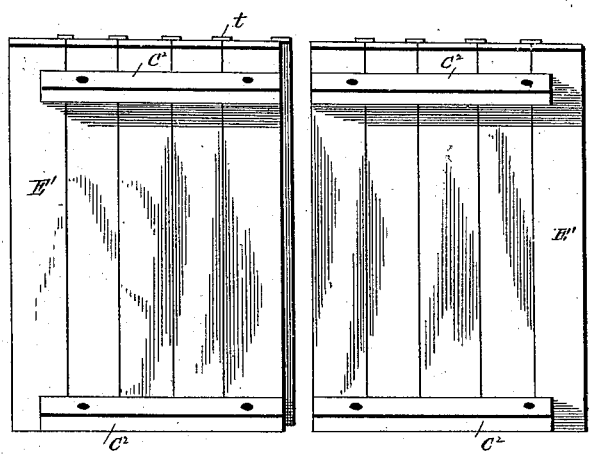

In the accompanying drawings, forming a part of this specification, Figure 1 is a perspective view of a house constructed according to my invention; Fig. 2, a perspective view of the frame; Fig. 3, a detail view; Fig. 4, a detail perspective view of one of the panels; Fig. 5, a longitudinal section of a modification of the house; Fig. 6, a perspective view of one of the panels for the same, and Fig. 7 a perspective view of a modified gable.

Similar letters refer to similar parts throughout the several views.

A represents the cross-sills, and A' the longitudinal sills, the former resting on the latter at their ends. These are plain scantling of any desired size and length, having perforations to receive the screw-bolts $a$, which secure them together, and the bolts are provided with nuts to hold them in place.

B represents the studs, and C C' lower and upper cross-pieces, which are nailed to the studs, so as to form a frame for the panels E.

In constructing the sides of the house I first form the frame from the studs and cross-pieces, and then nail the panels E thereto, the latter being the full length of the house, and then saw the panels through at about their centers before bolting the frames in position, as indicated by the line $b$ in Fig. 1, and also in Fig. 4, this being done so that they may be easily handled by one man. The cross-pieces C rest on and are securely bolted to the sills A A', and the cross-pieces C' fit beneath and are bolted to the wall-plates D, which they support, the latter being bolted together at their ends in a manner similar to the sills A A'.

F represents the rafters. These are nailed to the wall-plates D, and are halved together at their meeting ends, or they lap upon and are let into each other, and are held together by a pin, as clearly shown at $g$, Fig. 2, excepting the two rafters G' next to the ends, which are miter-joined. The rafters G' are set a short distance away from the end rafters, F, so as to receive between the rafters F and G' the gables G, for which they form a stay. The gables G are provided with tenons $c$, which fit in mortises $d$ in the end wall-plates, D, and are thus held in position.

One end of the house is constructed with a door, K, which is hinged to the frame E, and an upright plank, L, secured to the end of said frame, although, if desired, a door may be placed in each end. Each end of the side frames is also provided with planks M, nailed sidewise thereto, so as to form tight corners for the building, these planks being nailed thereto prior to the frames being secured to the sills.

The rafters are covered with sheathing-boards, and the latter may be covered with shingles, cloth, or iron, as preferred, and a comb, H, consisting of two boards nailed side and edge together, is secured to the ridge of the roof in any suitable manner. Through one of the gables, preferably the front, an opening, P, is made, through which the tongue of any sulky-machine may be inserted under the roof, and to protect its projecting end from the weather I form a small roof, N, (shown in Fig. 3,) by nailing two boards side and edges together and hanging two hooks, $n$—one at each side—thereto, which are caught in staples $o$, driven in said gable end to prevent the small roof being blown off.

Figure 7:
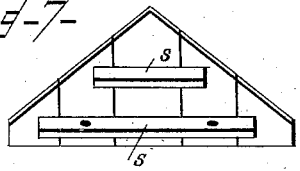

In Figs. 5, 6, and 7 I show a modified construction of the building above described, which is lighter and cheaper. In these figures, A A' are the cross and longitudinal sills, respectively, bolted together the same as those first described. E' represents the panels, which are in this instance made upright and nailed to two cross-pieces, C², which are bolted to the sills and to the wall-plates D, which rest on said cross-pieces. The meeting edges of the boards are covered by a strip, t, nailed to one of them. On the wall-plates the rafters F, which are in all respects similar to those above described, are nailed, and the gables placed between the two end rafters. The gables are also made upright, being nailed to cross-pieces S, the lower one of which is perforated for the reception of bolts, which pass through them and into the end wall-plates, where they are secured by nuts. Thus it will be seen that I do away entirely with the studding, and at the same time secure a very light and convenient house.

Small houses of this character are specially adapted to the protection and safe keeping of agricultural machines and implements, as they are easily removed from one part of a farm or plantation to another, the weight of the contents preventing the house from being blown over. A dump, grade, or apron may be used at the door or doors of the house when heavy machines are to be placed therein. When the house is to be used for farm-tools or seed and the like, the opening in the gable may be dispensed with.

Having thus described my invention, what I claim as new, and desire to secure by Letters Patent, is—

1. The combination of the sills A A', bolted together at their ends, the wall-plates D, the studs B, the cross-pieces C C', the panels E, the end rafters, F G', the gable ends G, fitted between said rafters, the roof, and a comb, H, substantially as set forth.

2. The combination, in a portable house, of the end rafters, F G', the gables G between said rafters, and having the tenons c, and the end wall-plates having mortises d, substantially as set forth.

3. The hereinbefore-described portable house, consisting of the sills A A', the studs B, the cross-pieces C C', the panels E, end boards, M, the perforated wall-plates D, the rafters F G', the gable ends G, having the tenons c and opening P, the comb H, door K, small roof N, having the hooks n, the staples o, and a suitable roof, substantially as described.

4. The side walls for a portable house, consisting of the studs B, the cross-pieces C C', secured to the ends thereof, the panels E, secured to said studs, and the end boards, M, secured to the ends of said panels and adapted to embrace the end of the adjacent section at the corner of the house, substantially as described.

In testimony whereof I affix my signature in presence of two witnesses.

JAMES K. P. SHELTON.

Witnesses:
T. M. BRUNSON,
WM. H. GREEN.